United States Patent [19]
Kim

[11] Patent Number: 5,754,635
[45] Date of Patent: May 19, 1998

[54] APPARATUS AND METHOD FOR RECEIVING MULTI-CHANNEL CALLER IDENTIFICATION DATA

[75] Inventor: Hong-Han Kim, Gumi, Rep. of Korea

[73] Assignee: SanSung Electronics Co., Ltd., Suwon, Rep. of Korea

[21] Appl. No.: 669,705

[22] Filed: Jun. 24, 1996

[30] Foreign Application Priority Data

Jun. 24, 1995 [KR] Rep. of Korea ............... 1995/17362

[51] Int. Cl.$^6$ .................... H04M 1/56; H04M 15/06
[52] U.S. Cl. .................. 379/142; 379/127; 379/157; 379/245; 379/339; 370/537
[58] Field of Search ...................... 379/142, 156, 379/164, 165, 171, 172, 173, 199, 232, 237, 89, 201, 214, 269, 127, 157, 245, 247, 122, 339; 370/535, 537

[56] References Cited

U.S. PATENT DOCUMENTS

| | | | |
|---|---|---|---|
| 5,268,903 | 12/1993 | Jones et al. | 379/165 |
| 5,311,576 | 5/1994 | Brunson et al. | 379/89 |
| 5,347,574 | 9/1994 | Morganstein . | |
| 5,396,548 | 3/1995 | Bayerl et al. . | |
| 5,473,671 | 12/1995 | Partridge, III . | |
| 5,475,744 | 12/1995 | Ikeda . | |
| 5,479,493 | 12/1995 | Baker et al. . | |
| 5,511,115 | 4/1996 | Bayerl et al. . | |

FOREIGN PATENT DOCUMENTS

| | | |
|---|---|---|
| 0674419A2 | 9/1995 | European Pat. Off. . |
| 0464610A2 | 1/1992 | Germany . |

*Primary Examiner*—Wing F. Chan
*Assistant Examiner*—Binh K. Tieu
*Attorney, Agent, or Firm*—Robert E. Bushnell, Esq.

[57] ABSTRACT

An apparatus for receiving multi-channel caller identification data in a switching system with a path forming portion for forming a path to receive the caller identification data in response to an incoming ring signal from a plurality of central office lines; a multiplexer for selecting one of a plurality of channel signals containing the call identification data and received from the path forming portion; a decoder for sampling an analog signal of a corresponding channel selected by the multiplexer at a predetermined sampling frequency, to thereby convert the analog signal containing the call identification data into a PCM signal; a time switch for switching and outputting the converted PCM signal converted in the decoder and containing the call identification data to a corresponding channel; a demodulator for receiving the PCM signal output through the time switch to thereby demodulate the caller identification data; and a controller establishing a path for the caller identification data in response to the detection of the caller identification data, the controller controlling the display of the caller identification data by analyzing data demodulated in the demodulator.

5 Claims, 4 Drawing Sheets

APPARATUS AND METHOD FOR RECEIVING MULTI-CHANNEL CALLER IDENTIFICATION DATA

CLAIM OF PRIORITY

This application make reference to, incorporates the same herein, and claims all benefits accruing under 35 U.S.C §119 from an application entitled APPARATUS AND METHOD FOR RECEIVING MULTI-CHANNEL Caller IDENTIFICATION DATA earlier filed in the Korean Industrial Property Office on 24 Jun. 1995 and there assigned Ser. No. 17362/1995.

BACKGROUND OF THE INVENTION

1. Field of the Invention

The present invention relates to a digital switching system and, more particularly, to an apparatus and process for demodulating caller identification data from a signal received through an office line.

2. Description of the Related Art

Generally, a switching system displays caller identification data (ID) for identifying a caller on the displaying device of a terminal, when a call is received. For caller identification data, a caller's phone number and name, the kind and time of call are transmitted during the idle period between ring signals, as shown in the following table.

TABLE 1

| LINE | DATA | TIME | PHONE NUMBER | NAME |
|---|---|---|---|---|
| #1 | JUN, 05 | 11:15 PM | 321-7654 | LEE JUNG-SUNG |
| #3 | OCT, 15 | 10:03 AM | 460-2833 | PARK SU-BANG |
| #9 | SEP, 12 | 09:10 PM | 524-3333 | KIM MIN-HO |

In such a switching system, a transmitting data stream is constructed in a manner that additional data is added to to-be-transmitted data, in order to reduce errors that may be generated during modulation, and errors caused due to a transmission line, and also in order to facilitate the restoration of data on the receiving party.

FIG. 1 shows a data stream format transmitted in the digital switching system transmitting caller ID. The data stream consists of a channel seizure signal 110, mark signal 120, caller ID 130 and 140, and checksum 150. The channel seizure signal 110 is constructed in a manner such that a space signal "0" and mark signal "1" are alternately repeated. The receiving party can recognize the start point of a data stream by confirming the reception of the channel seizure signal 110. The mark signal 120 shows a space time until the actual data is received, from channel seizure signal 110 wherein logic "1" signals are continuously formed. The caller ID consists of message information 130 on a caller identification massages for transmission, and an actual message 140 which is a caller identification message for actual transmission. Message information 130 includes a message type 132 showing the type of message, and message length 136 showing the length of transmitted message. The caller identification message 142 which is actually transmitted is constructed with ASCII codes whose unit length is one word (eight bits). Behind message type 132, message length 136 and caller identification message 142, mark bits 134, 138 and 144 are placed, respectively. Before and after message type 132, message length 136 and caller identification message 142, a start bit "0" and a stop bit "1" are added, respectively. For the accuracy of information, checksum 150 is placed at the end of the transmitted data stream.

The earlier patent to Baker, et al. U.S. Pat. No. 5,479,463 discloses a calling line identification system that essentially corresponds to the prior art system illustrating in FIG. 2 of the present application. More particularly, it is to be noted that FIG. 3 of Baker, et al. illustrates the use of separate FSA demodulators and separate UART unit for each telephone line.

Morganstein, U.S. Pat. No. 5,347,574, suggests an automatic call screening apparatus in which a single call identity telephone number receiver 39 is connected to a multiplicity of lines through a switch matrix 40. Partridge III, U.S. Pat. No. 5,473,671 discloses a telephone apparatus in which a single caller ID decoder 42 is connected via a switch 50 to a multiplicity of telephone lines or, as illustrated in FIG. 1 thereto, a caller ID unit 27 is connected via a switch 50 and a controller 10 to a multiplicity of telephone lines. As with the other contemporary circuit designs however, neither Morgenstein '574 nor Partridge '671 is unable to accommodate the use of time division multiplexing in conjunction with a digital signal processor.

SUMMARY OF THE INVENTION

It is an object of the present invention to provide an improved telecommunications process and network.

It is another object to provide an apparatus and process using a simplified construction for receiving a caller ID.

It is another object to provide an apparatus and process capable of receiving caller ID while processing multi-channel transmitted data.

To accomplish these and other objects of the present invention, there is provided an apparatus for receiving multi-channel caller identification data with a path forming portion for forming a path to receive the caller identification data in response to an incoming ring signal incoming from one of a plurality of office lines. A multiplexer selects one of a plurality of channel signals received from the path forming portion, a decoder samples an analog signal of a corresponding channel selected by the multiplexer at predetermined sampling frequency in order to convert the analog signal into a pulse code modulated (i.e., PCM) signal, and a time switch conducts the converted PCM signal converted in the decoder to a corresponding channel. A demodulator receives the PCM signal output through the time switch and demodulates the caller identification data. A controller regulates the path of the caller identification data in response to the detection of the caller identification data. The controller also regulates a display of caller identification data by analyzing data demodulated in the demodulator.

There is further provided a process for receiving multi-channel caller identification data in a switching system by forming a path to receive the caller identification data in response to an incoming ring signal from one of a plurality of office lines; selecting a channel of a received signal and then sampling an analog signal of a corresponding channel at a predetermined sampling frequency in order to convert the analog signal into a PCM signal; and receiving the PCM data, converting a digital signal into binary data according to an internal program, and extracting and demodulating only the caller identification data.

BRIEF DESCRIPTION OF THE ATTACHED DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENT

Figure 2:
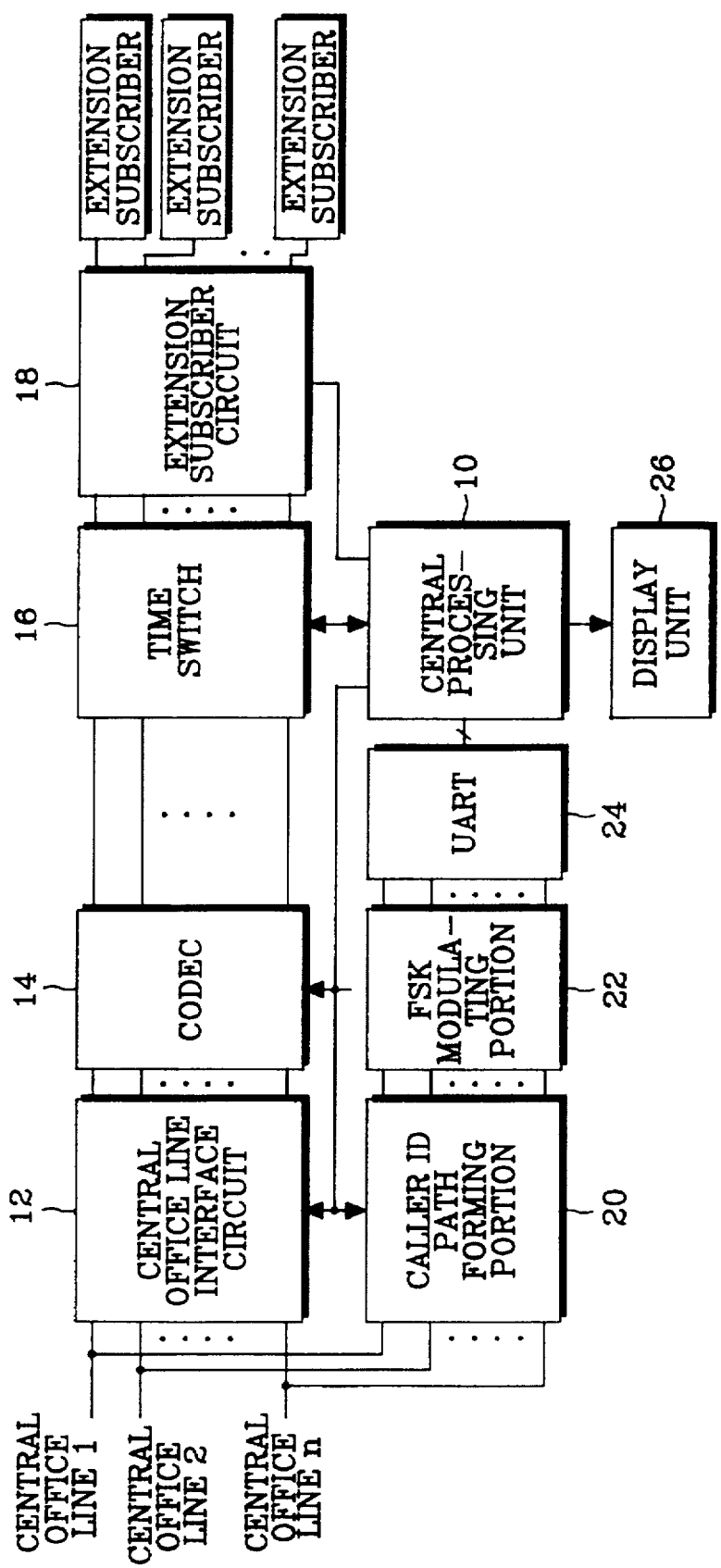
FIG. 2 is a simplified block diagram representing salient features of a hypothetical typical conventional caller identification data demodulator.

Turning again to the drawings, FIG. 2 is a simplified block diagram illustrating salient features of a hypothetical conventional caller ID demodulating apparatus. Central processing unit 10 controls the overall operation of the switching system in response to the detection of an incoming caller ID in a ring signal, to thereby form a caller ID path. The unit also analyzes caller ID information, to display the caller ID. A central office line interface circuit 12 detects a ring signal supplied from a plurality of office lines 1-n, and seizes a corresponding office line according to the central processing unit 10, to thereby form an office line loop. The interface circuit 12 interfaces a signal coming from the office line. A codec 14 converts an analog signal input from a central office line interface circuit 12 into a digital signal, and then outputs it to time switch 16. The codec 14 also converts a digital signal input from time switch 16 into an analog signal, and then outputs it to the central office line interface circuit 12.

Figure 1:
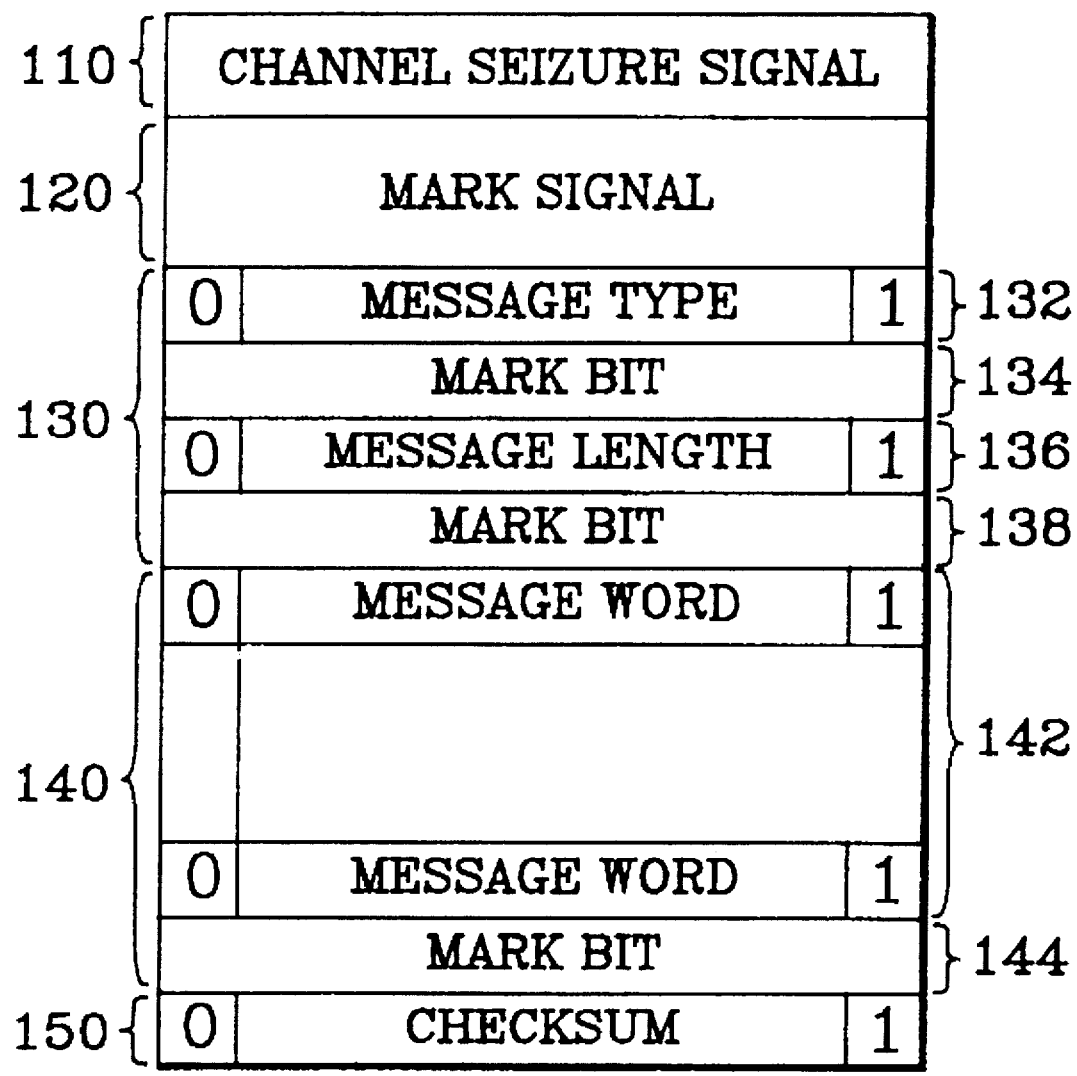
FIG. 1 shows a format for caller identification data used according to current industry convention.

The time switch 16 switches various tone signals and audio data under the control of the central processing unit 10. An extension subscriber circuit 18 applies current to a plurality of extension subscriber phones, and at the same time, interfaces various tone signals and audio data coming from an extension subscriber. A caller ID path forming portion 20 forms a path so that the caller ID consisting of asynchronous serial data, to which a start bit and stop bit as shown in FIG. 1 has been added, is received under the control of the central processing unit 10 during the idle time of a ring signal, when a ring signal received from an office line has been detected. A frequency shift keying (FSK) modulating portion 22 frequency-shift keys the caller ID received, and then outputs it to a universal asynchronous receiver and transmitter (UART) 24. UART 24 converts the frequency-shift keyed serial data into 8-bit parallel data by removing its start bit and stop bit. Then, the converted data is supplied to the central processing unit 10. At this time, the central processing unit 10 recognizes the caller ID to display data as shown in table 1 on a display unit 26 so that a user can determine the identify of the caller. This type of caller ID receiving circuit uses an FSK modulating portion 22 and UART 24 for the office lines, in order to receive a caller ID which uses a plurality of office lines. Accordingly, this complicates its circuits, and increases the cost. In particular, when several channels operate at the same time, demodulators must be connected to each of the respective channels. This requires that the number of demodulators correspond to the number of channels.

Figure 3:
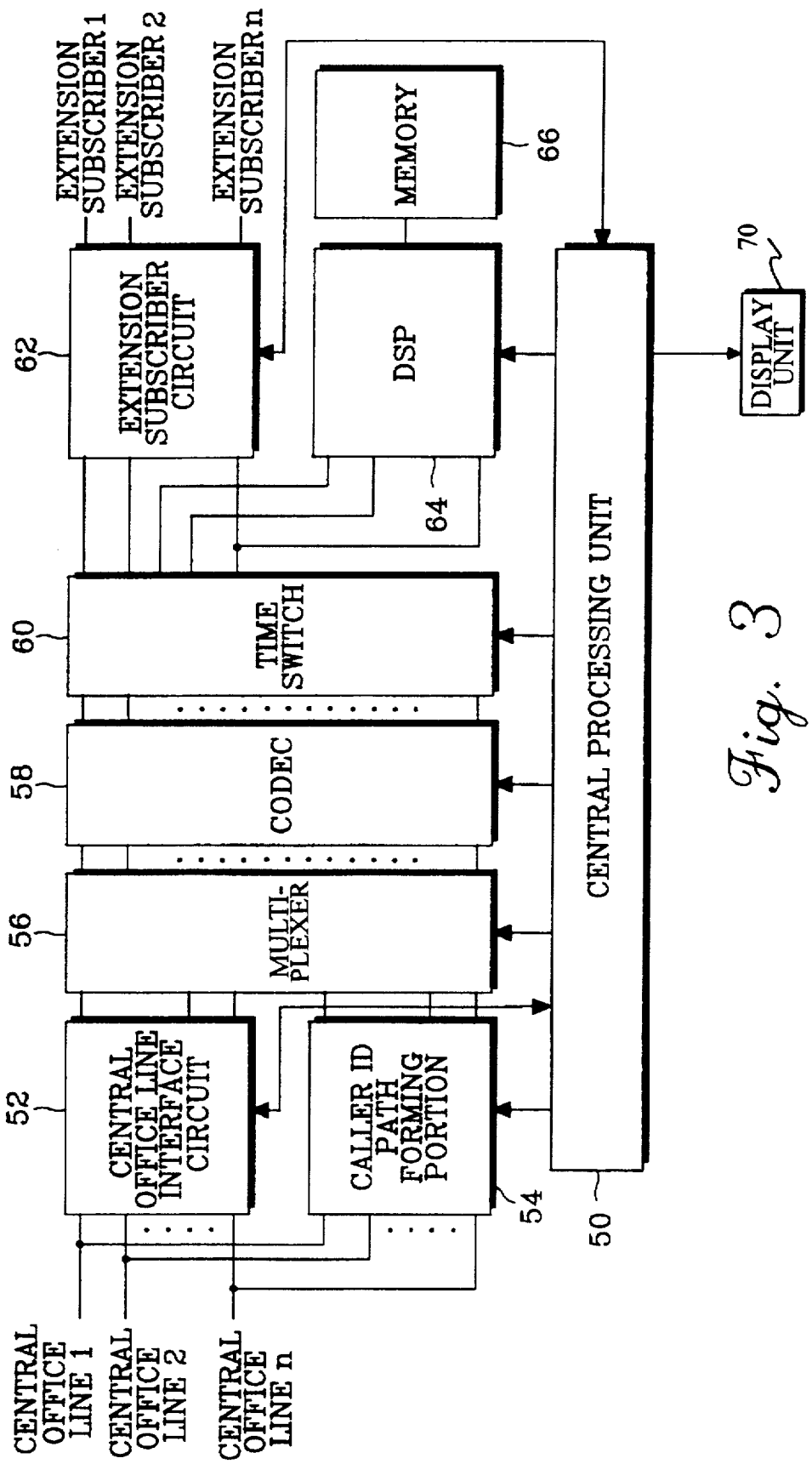
FIG. 3 is a block diagram of a caller identification data demodulator constructed in accordance with the principles of the present invention.

A preferred embodiment of the present invention will be explained below with reference to the accompanying drawings. FIG. 3 is a block diagram of a caller ID demodulator constructed in accordance with the principles of the present invention. Central processing unit 50 controls the overall operation of the switching system in response to the detection of an incoming caller ID in a ring signal, to thereby form a caller ID path. The unit also analyzes caller ID information, to display the caller ID. A central office line interface circuit 52 detects a ring signal supplied from a plurality of office lines 1-n, and seizes a corresponding central office line according to the central processing unit 50, to thereby form a central office line loop. The interface circuit 52 interfaces a signal coming from the central office line.

A caller ID path forming portion 54 forms a path so that the caller ID, consisting of asynchronous serial data, to which a start bit and stop bit have been added, is received under the control of central processing unit 50 during the idle time of a ring signal, when a ring signal received from a central office line is detected. A multiplexer 56 selects the output signal of central office line interface circuit 52 and a signal received from caller ID path forming portion 54 according to the central processing unit 50. A codec 58 samples an analog signal selected from multiplexer 56 at 8 KHz, and converts the sampled signal into a PCM signal, and then outputs it to a time switch 60. At this time, the central processing unit 50 controls the time switch 60 to supply a digital signal converted in the codec 58 to a digital signal processor (DSP) 64. Then, the DSP 64 converts the supplied digital signal into a binary data according to an internal program and extracts only the caller ID from the binary data. The caller ID is then stored in an external memory 66, and is subsequently transmitted when required later. Display unit 70 may display the ID data.

As compared with the aforementioned conventional technology, the present invention improves upon contemporary practice by replacing the intermediate step of demodulating the caller ID using the FSK modulating portion 22 and UART 24 of FIG. 2, with a network that may operationally rely upon software contained within the DSP 64. Accordingly, it is possible to remarkably reduce the amount of hardware of the apparatus. When multi-channels operate at the same time, codec 58 and time switch 60, which are incorporated in the conventional switching system for processing input data as described in FIG. 2, are only used, without all the hardware required for the operation of a multi-channel system like that of the conventional technology.

Figure 4:
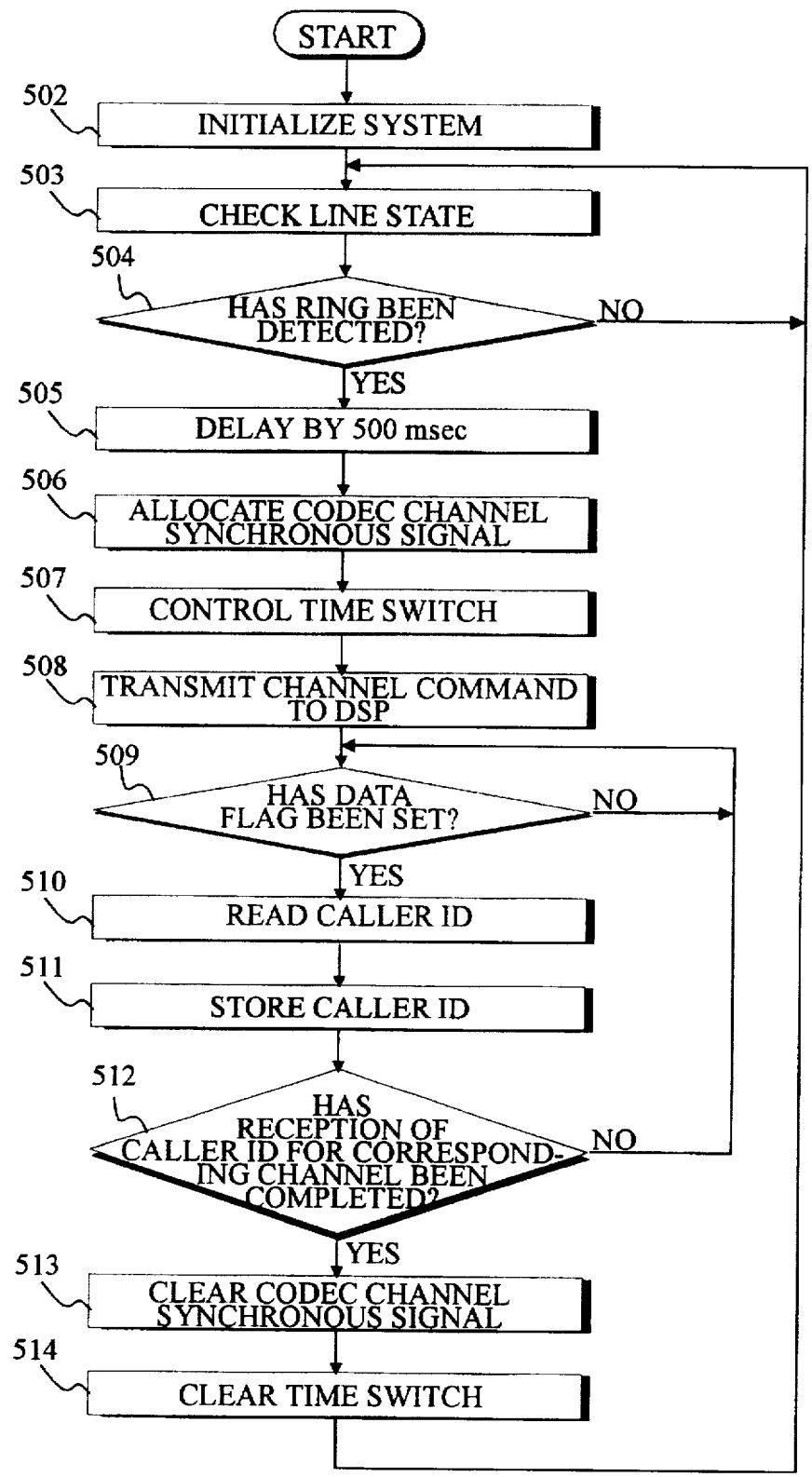
FIG. 4 is a flowchart showing the demodulation of caller identification data in accordance with the practice of the present invention.

FIG. 4 is a flowchart showing the demodulating of the caller identification data in accordance with the present invention. The demodulating process is typically executed by assigning a channel number when a ring is received, generating a time switching control signal, transmitting a command to demodulate the caller ID in the DSP, checking a data flag, and receiving and storing the caller ID when the data flag is set, and clearing the assigned channel number and the time switch.

First, when power is applied, the central processing unit 50 initializes all the internal memories and internal registers in step 502, and then checks the central office line state through central office line interface circuit 52 in step 503. At this time, central processing unit 50 determines whether or not a ring signal has been detected from the central office line interface circuit 52 in step 504, and if a ring signal has been detected, moves to step 505. During step 505, the central processing unit 50 waits for 500 msec. When the ring signal has been detected, central processing unit 50 transmits the first ring signal for two seconds, and then has a pause time for 4 seconds until the second ring signal is transmitted. The caller ID is transmitted during the idle time. Accordingly, after two seconds for the first ring signal, and with the passage of 500 msec, the caller ID is transmitted within 3.3 seconds.

With the passage of 500 milliseconds, central processing unit 50 controls caller ID path forming portion 54 to form a path, controls multiplexer 56 as so to supply a signal output from the caller ID path forming portion 54 to the codec 58, and then enables codec 58 and assigns the channel synchronous signal in step 506. Then, the codec 58 samples an analog caller ID at an 8 KHz frequency, to in order to convert it into eight-bit PCM data. In step 507, central processing unit 50 controls the time switch 60 to supply the PCM data converted in the codec 58 to the DSP 64 through the assigned channel, and then moves to step 508. The central processing unit 50 transfers a demodulating command to the DSP 64, which is to demodulate the PCM data in the DSP 64 through the assigned channel. At this time, the DSP 64 receives the PCM data output from the codec 58, and demodulates the caller ID and stores it in the memory 66. This demodulating operation is disclosed in detail in Korean Pat. Application. No. 1105, filed by the Applicant.

In step 509, central processing unit 50 determines whether not the data flag has been set, and if data flag has been set, moves to step 510. The central processing unit 50 reads the demodulated caller ID being stored in the memory 66 in step 510, and then stores it in its internal memory in step 511. In step 512, central processing unit 50 determines whether or not the reception of caller ID for a corresponding channel has been completed, and if not completed, goes back to step 509. If the reception has been completed, the channel synchronous signal of codec 58 and time switch 60 are respectively cleared in steps 513 and 514, and then the system goes back to step 503, and checks the state of the line. By repeating this operation for the all of the channels at this time, the caller ID received from a plurality of office lines can be demodulated. The information can then be displayed on display unit 70.

As described above, the present invention forms the signal path corresponding to caller information, and digital-signal processes with software, using the coder and time switch used in the conventional switching system, in order to demodulate the caller ID. Accordingly, the construction of the demodulator and modulator of the caller ID is simplified, and thus cost for the apparatus is reduced. Also, high reliability can be obtained using a DSP, and the software can be modified to be positively acceptable according to a user's demands.

What is claimed is:

1. An apparatus for receiving multi-channel caller identification data in a switching system, said apparatus comprising:

path forming means for forming a path to receive said caller identification data in response to an incoming ring signal from one of a plurality of central office lines;

multiplexer for selecting one of a plurality of channel signals containing said caller identification data and received from said path forming means;

decoding means for converting an analog signal into a PCM signal by sampling said analog signal containing said caller identification data and received via a corresponding channel selected by said multiplexer at a predetermined sampling frequency;

time switching means for switching and outputting said converted PCM signal converted in said decoding means and containing said caller identification data to a corresponding channel;

demodulating means for receiving said PCM signal output through said time switching means so as to demodulate said caller identification data; and controlling means for controlling a path of said caller identification data in response to the detection of said caller identification data, said controlling means controlling the display of said caller identification data by analyzing data demodulated in said demodulating means.

2. The apparatus of claim 1, with said decoding means sampling said analog signal at a sampling frequency of eight kilohertz.

3. A method of receiving multi-channel caller identification data in a switching system, the method comprising the steps of:

forming a path to receive said caller identification data in response to an incoming ring signal from one of a plurality of central office lines;

selecting a channel of a received signal containing said caller identification data and then sampling an analog signal of a corresponding channel containing said caller identification data at a predetermined sampling frequency, to convert the analog signal into a PCM signal containing said caller identification data; and receiving the PCM data, converting a digital signal to binary data according into an internal program, and extracting and demodulating only the caller identification data.

4. A method of receiving multi-channel caller identification data in a switching system, the method comprising the steps of:

forming a path to receive the caller identification data in response to a incoming ring signal from one of a plurality of central office lines;

selecting one of a plurality of channel signals containing said caller identification data received while forming said path;

converting an analog signal containing said caller identification data into pulse code modulated data by sampling said analog signal on a channel corresponding to said selected channel signal, at a predetermined sampling frequency;

switching said pulse code modulated data containing said caller identification data to a corresponding channel;

demodulating caller identification data from said pulse code modulated signal received via said corresponding channel; and controlling a path for transmission of said caller identification data in response to the detection of said caller identification data, thereby controlling the display of the caller identification data by analyzing demodulated data.

5. The method of receiving multi-channel caller identification data as claimed in claim 4, comprised of sampling said analog signal with said predetermined sampling frequency set to eight kilohertz.

* * * * *